Sept. 18, 1951  W. COMELLO  2,568,221
LIVE BAIT BUCKET
Filed Dec. 31, 1949
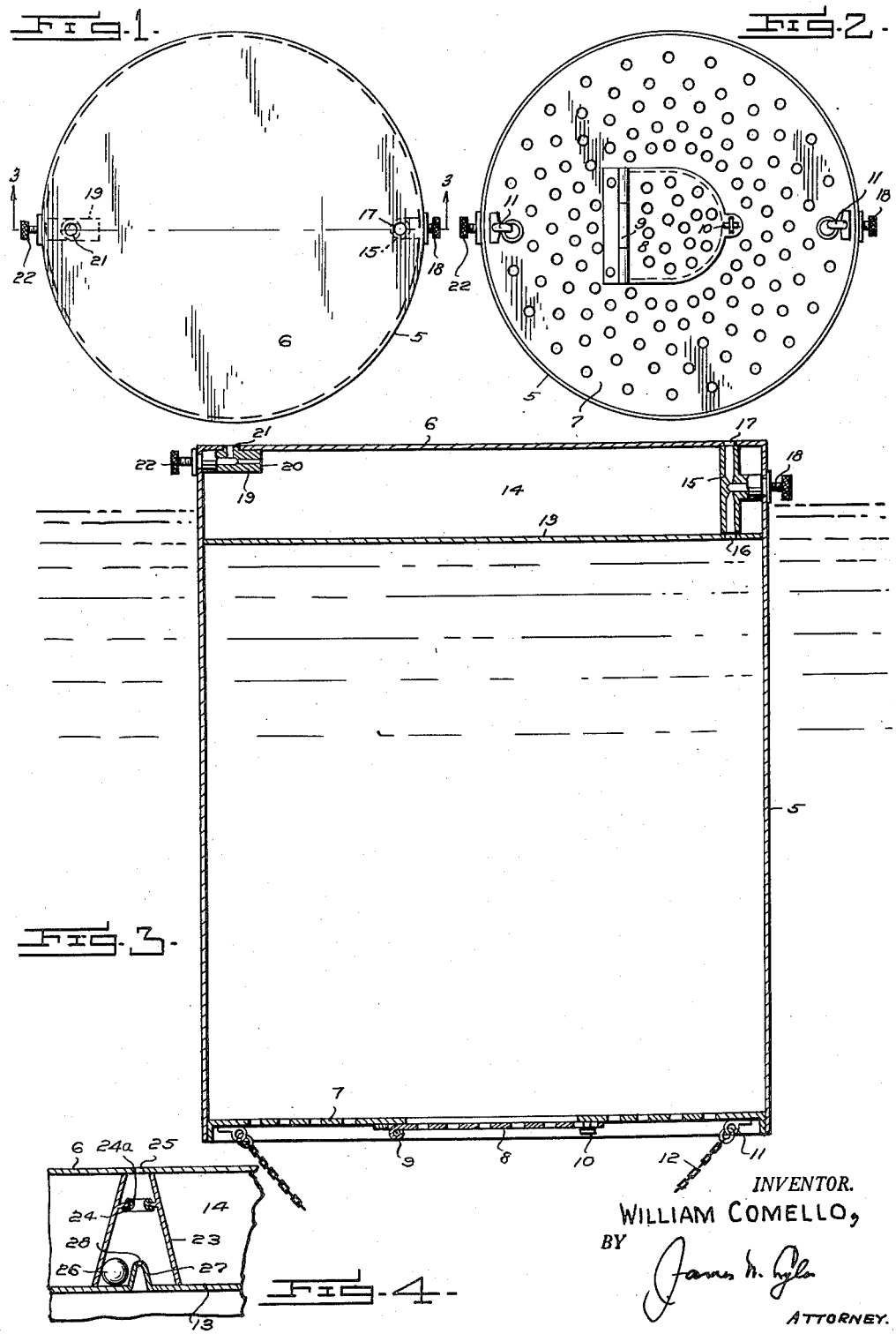
INVENTOR.
WILLIAM COMELLO,
BY
ATTORNEY.

Patented Sept. 18, 1951

2,568,221

UNITED STATES PATENT OFFICE 2,568,221

LIVE BAIT BUCKET

William Comello, St. Joseph, Mo.

Application December 31, 1949, Serial No. 136,290

4 Claims. (Cl. 43—56)

This invention relates to live bait buckets and has particular reference to a bait bucket capable of being transported from place to place with its bait compartment containing water, without danger of leakage from the bucket, thus avoiding a separate imperforate container as is commonly used in bait buckets now in use.

It is an object of the invention to provide a bait bucket closed at its bottom and having a perforated top, with the bottom portion of the bucket provided with an air chamber, that is calculated to float the bucket in the water in inverted manner, and having valvular means of draining the air from the bucket when inverted and immersed in the water, thus avoiding an air-lock in the bait compartment and assuring that the bait compartment will be completely filled with water.

The invention further contemplates a combined air-control and drainage valve for the air compartment, and through the medium of which the air in the air compartment may be completely released, forcing the compartment to fill with water, at such times as it is desired to completely submerge the bucket.

The invention further contemplates a novel form of check valve, whereby the air in the bait compartment will be automatically exhausted when the bucket is inverted and placed in the water, such valve serving also as an automatic check against the drainage of water from the bait compartment when the bucket is being transported.

A further object of the invention resides in a novel form of live bait bucket, that is extremely simple in construction, is strong, cheap to manufacture and is efficient in use.

Other objects and advantages of the invention will be readily apparent during the course of the following description, reference being had to the accompanying drawings, wherein there has been illustrated the preferred examples of the invention, and wherein like characters of reference denote like parts throughout.

In the drawings:

Figure 1 is a bottom plan view of the bucket,

Figure 2 is a top plan view thereof,

Figure 3 is a vertical sectional view of the bucket in inverted position, taken on line 3—3 of Figure 1, and Figure 4 is a fragmentary vertical section illustrating a modified form of air relief valve.

Referring specifically to the drawings, the numeral 5 designates a cylindrical bucket having a closed bottom 6 and a perforated top 7. The top 7 may be soldered or otherwise permanently secured to the open upper end of the bucket. An access door 8 is hinged at 9 to the top 7 and serves as the means whereby the operator may reach into the bucket for the removal of minnows or the like. The door 8 is also perforated and is provided with latch means 10 for securely retaining the door against accidental opening. Eyelets 11 are fixed at diametrically opposite points on the top 7 to which is attached any convenient and desirable form of handle, bail, or flexible carrying device, such as a chain 12.

Spanning the bucket adjacent its bottom and spaced therefrom is a wall 13, forming an air chamber 14. The air chamber 14 serves as the means for floating the bucket in the water in inverted position for the major portion of its height. A T-shaped air exhaust valve designated by the numeral 15 spans the width of the air chamber 14, and has communication at one end 16 with the interior of the bucket 5, while its opposite end 17 communicates with the atmosphere through the bottom 6. The valve 15 is arranged adjacent one side wall of the bucket, and has its valve stem 18 projecting outwardly for convenient operation thereof. The valve 15 is preferably of the needle type. A combined air exhaust and drainage valve 19, T-shaped, is positioned upon the bottom 6 and against the side wall of the bucket, and has one end 20 communicating with the interior of the air chamber 14 and a lateral branch 21 communicating with the outer surface of the bottom 6. A needle valve stem 22 is threaded into the valve 19 and serves, when in seated position, to close off any communication with the chamber 14. The valves 15 and 19 are welded or soldered in fluid tight position within the chamber 14.

In the form of the invention shown in Figure 4 the valve 15 has been dispensed with, and a hollow frusto-conical member 23 spans the air chamber 14. A valve seat 24 spans the member 23 intermediate its length, said valve seat being preferably provided with a rubber lining 24a. An opening 25 is provided in the wall 6 in axial alignment with the seat 24. A weighted ball 26 is adapted to automatically engage the seat 24 when the bucket is inverted to an upright carrying position. An inwardly projecting boss 27 is formed in the partition wall 13 and has a centrally disposed and relatively small opening 28, axially aligned with the valve seat 24. The boss is rounded at its inner end to avoid any possibility of the ball 26 seating thereon.

In the use of the device the valve 15 is closed and the bucket positioned in an upright position upon its bottom. Water is then placed within the bait compartment, at which time minnows or other live bait may be placed therein. The door 8 is then closed and latched, and is ready to be transported to the desirable place for fishing. Since it is common practice to submerge the bait bucket in the water for maintaining the bait in the best condition, the operator upon reaching his destination places the bucket in the water in any desired manner, previously having opened the valve 15. The bucket then swings to the inverted position, due primarily to the air chamber 14 and, since the valve 15 is open, the water rushing into the bait compartment will force all of the air that might otherwise be trapped in the bottom of the bucket, the air passing outwardly through the valve 15. This insures against any air being trapped within the bucket, causing the bucket to float in a level inverted position in the water. Should it be desired to completely submerge the bucket, the valve 19 is opened permitting water to enter the compartment 14 while the air is being exhausted therefrom. Obviously, to accomplish this, the operator must force the bucket downwardly to a point below the surface of the water. When it is desired that the bucket shall be buoyant again, the operator merely holds the bucket in an upright position or slightly tilted toward the valve 19, at which time the water in the chamber 14 will drain through the valve 19, being replaced by air. The valve 19 is then closed, locking the air therein against displacement. In the form of the invention shown in Figure 4, it may be found desirable to place relatively fine mesh screens over the openings 25 and 28 to prevent the entry of any foreign matter likely to keep the ball 26 from a proper water-tight seat.

It will be apparent from the foregoing that a very novel form of bait bucket has been provided. The valve structures 15 and 19 may be varied as to construction, while the valve 15 may be omitted and the valve structure of Figure 4 substituted therefor. The valves 15 and 24 obviously serve an identical purpose, that is, the relief of air from the bait compartment when the bucket is submerged and also as a means to prevent the leakage of water from the bait compartment when the bucket is carried in an upright manner.

It is to be understood that the invention is not limited to the precise construction and arrangement of parts, but that it includes within its purview whatever changes fairly come within either the terms or the scope of the appended claims.

Having described my invention, what I claim as new and desire to secure by patent is:

1. A live bait bucket of the character described, comprising a cylindrical container closed at its bottom and having a perforated top, a perforated access door hinged to the top, an air chamber formed in the bottom of the container, an air relief valve communicating with the interior of the container and with the atmosphere, and a valve communicating with the atmosphere and with the interior of the air chamber.

2. A live bait bucket of the character described comprising a cylindrical container having a closed lower end and a perforated upper end, an access door hingedly supported on the perforated end substantially centrally thereof, latch means for the door, handle attaching members secured to the perforated end, a wall spanning the container in spaced relation to the bottom for forming an air chamber, a valve positioned in the air chamber and communicating at one end with the interior of the container and its opposite end communicating with the atmosphere, manually controlled means extending outwardly of the container for opening and closing the valve, and a combined air and drainage valve positioned in the air chamber at a point diametrically opposite the first named valve, and having one end communicating with the air chamber and one end communicating with the atmosphere, each of said valves having a manually controlled valve stem extending outwardly of the container wall.

3. A live bait bucket of the character described comprising a cylindrical container closed at its bottom and provided with a top perforated wall, said top provided with a relatively large centrally disposed opening, a perforated closure door hingedly supported upon the top and adapted to overlie said opening, handle supporting means fixed to the top at diametrically opposite points, a wall spanning the container in spaced relation to the bottom for forming an air chamber, a T-shaped valve arranged within the air chamber and communicating at one end with the interior of the container and at its opposite end communicating with the atmosphere through the bottom, a manually controlled valve stem for the valve extending outwardly of the side of the container, a combined air relief and drainage valve of T-shape positioned in the air chamber at a point diametrically opposite the first named valve and in direct contact with the bottom of the container, said last named valve communicating at one end with the interior of the air chamber and with the atmosphere through the bottom of the container, and a manually controlled valve stem for the second named valve extending outwardly of the side of the container, said valves being sealed with respect to the leakage of water to the air compartment from the interior of the container and from the exterior when the valves are closed.

4. A live bait bucket comprising a bottom member, a perforated top member, an air chamber formed at the lower end of the bucket, a hollow wall frusto-conical in cross section spanning the air chamber, a valve seat spanning the interior portion of said hollow frusto-conical wall, a ball adapted to engage the seat when the bucket is in an upright position, said bottom provided with an air escape opening to the atmosphere in axial alignment with the seat, an upstanding boss extending into the cone and provided with a small air escape opening in axial alignment with the seat and communicating with the interior of the container, said seat provided with a resilient liner, and a T-shaped air relief valve positioned within the air chamber and having communication with the chamber and the atmosphere and manually controlled means for the valve.

WILLIAM COMELLO.

REFERENCES CITED

The following references are of record in the file of this patent:

UNITED STATES PATENTS

| Number | Name | Date |
| --- | --- | --- |
| 354,958 | Weightman | Dec. 28, 1886 |
| 1,576,688 | Thompson | Mar. 16, 1926 |